United States Patent [19]

Kinoshita

[11] Patent Number: 4,645,783
[45] Date of Patent: Feb. 24, 1987

[54] ADHESIVE COPOLYMER MICROSPHERES-CONTAINING AQUEOUS SUSPENSION AND METHOD FOR PRODUCING THE SAME

[75] Inventor: Toru Kinoshita, Tokyo, Japan

[73] Assignees: Sanyo Kokusaku Pulp Co.; Saiden Chemical Industry, Co., Ltd., both of Tokyo, Japan

[21] Appl. No.: 699,554

[22] Filed: Feb. 8, 1985

[51] Int. Cl.$^4$ .............................................. C08L 00/00
[52] U.S. Cl. .................... 523/221; 524/26; 524/460; 524/522; 524/523
[58] Field of Search ................ 523/221; 524/26, 460, 524/522, 523

[56] References Cited

U.S. PATENT DOCUMENTS

| | | | |
|---|---|---|---|
| 2,754,240 | 7/1956 | Kinney | 524/26 |
| 3,375,121 | 3/1968 | Bildusas | 524/26 |
| 3,392,048 | 7/1968 | Rolik | 524/26 |
| 3,691,140 | 9/1972 | Silver | 524/812 |
| 3,857,731 | 12/1974 | Merrill et al. | 526/307 |
| 4,166,152 | 8/1979 | Baker et al. | 524/832 |

FOREIGN PATENT DOCUMENTS 0225965  12/1958  Australia ............................. 524/26

Primary Examiner—Edward J. Smith
Assistant Examiner—J. M. Reddick
Attorney, Agent, or Firm—Browdy and Neimark

[57] ABSTRACT

A repeatedly usable and releasable sheet is coated thereon with an adhesive copolymer microspheres-containing aqueous suspension and polymer microparticles prepared by polymerization of one or more vinyl monomers. In the presence of a protective colloid comprising casein, the microspheres is prepared by aqueous suspension polymerization of (a) from 70 to 99.9 percent by weight of one or more monomers selected from the group consisting of alkyl acrylate esters and alkyl methacrylate esters, (b) from 0.1 to 10 percent by weight of one or more α-monoolefin carboxylic acids and (c) from 0 to 29.9 percent by weight of one or more vinyl monomers other than the foregoing (a) and (b).

3 Claims, No Drawings

ADHESIVE COPOLYMER MICROSPHERES-CONTAINING AQUEOUS SUSPENSION AND METHOD FOR PRODUCING THE SAME

BACKGROUND OF THE INVENTION

This invention relates to an adhesive copolymer microspheres-containing aqueous suspension which is usable as an adhesive for an adhesive sheet or tape, and particularly relates to a repeatedly usable and releasable adhesive sheet or tape which allows a step of bonding the adhesive sheet or tape to a substrate and a step of removing the sheet or tape from the substrate to be repeatedly carried out.

U.S. Pat. No. 3,691,140 dated Sept. 12, 1972 by Silver and U.S. Pat. No. 4,166,152 dated Aug. 28, 1979 by Baker et al disclose infusible, solvent-dispersible, solvent-insoluble, inherently tacky, elastomeric copolymer microspheres. The Silver and Baker et al patents also disclose that the copolymers are dispersed in solvents, followed by spraying the resulting solution of the copolymers on a substrate and that the copolymers permit bonding of paper and other materials to various substrates and permit easy removal of bonded paper from the substrate without tearing. However, in the processes of Silver and Baker et al, the monomeric components are polymerized in the absence of a protection colloid. Therefore, it was found that when the adhesives obtained from the copolymer microspheres of the Silver and Baker et al patents are coated on paper and dried, the resulting adhesive-coated paper is not a coated paper which can be repeatedly used and released.

SUMMARY OF THE INVENTION

The present inventor has made research to overcome the above-mentioned shortcomings, and has developed a coated paper or tape which allows the repetition of a step of bonding to a substrate and a step of removal from the substrate.

DETAILED DESCRIPTION OF THE INVENTION

The present invention comprises an adhesive copolymer microspheres-containing aqueous suspension prepared by aqueous suspension polymerization of the following ingredients in the presence of a protective colloid comprising casein as a main ingredient:
(a) from 70 to 99.9 percent by weight of one or more monomers selected from the group consisting of alkyl acrylate esters and alkyl methacrylate ester, in which said alkyl moiety has 4–12 carbon atoms;
(b) from 0.1 to 10 percent by weight of one or more α-monoolefin carboxylic acids; and
(c) from 0 to 29.9 percent by weight of one or more vinyl monomers other than the foregoing (a) and (b).

The present invention further comprises an aqueous suspension comprising:
(A) adhesive copolymer microspheres having an average particle diameter of 10–100μ prepared by aqueous suspension polymerization of 100 parts by weight comprising the following monomers (a), (b) and (c) in the presence of a protective colloid comprising casein as a main ingredient:
(a) from 70 to 99.9 percent by weight of one or more monomers selected from the group consisting of alkyl acrylate esters and alkyl methacrylate esters, in which said alkyl moiety has 4–12 carbon atoms,
(b) from 0.1 to 10 percent by weight of one or more α-monoolefin carboxylic acids, and
(c) from 0 to 29.9 percent by weight of one or more vinyl monomers other than the foregoing (a) and (b); and
(B) polymer microparticles having an average particle diameter of 0.1–4μ prepared by polymerization of 20–300 parts of weight of one or more vinyl monomers in an aqueous medium.

The present invention further comprises a method of preparing an aqueous suspension comprising the steps of:
(1) aqueous suspension polymerizing 100 parts by weight of the following monomer ingredients comprising (a), (b) and (c) in the presence of a protective colloid of casein as a main ingredient:
(a) from 70 to 99.9 percent by weight of one or more monomers selected from the group consisting of alkyl acrylate esters and alkyl methacrylate esters, in which said alkyl moiety has 4–12 carbon atoms,
(b) from 0.1 to 10 percent by weight of one or more α-monoolefin carboxylic acids, and
(c) from 0 to 29.9 percent by weight of one or more vinyl monomers other than the foregoing (a) and (b),
to form an aqueous suspension containing adhesive copolymer microspheres having an average diameter of 10–100μ, and then
(2) polymerizing in the suspension 20–300 parts by weight of one or more vinyl monomers to form polymerized microparticles having an average diameter of 0.1–4μ.

Petroleum resins, natural resins and derivatives thereof may also be used as ingredient (d). A wide variety of resins may be used as ingredient (d) and they include polyterpene resins, modified terpene resins, aliphatic hydrocarbon resins, cyclopentadiene resins, aromatic petroleum resins, rosin, rosin esters, phenolic resins, styrene resins and xylene resins. The (meth)acrylate used as ingredient (a) provides tackiness and internal cohesive force. In order to obtain high elasticity, the (meth)acrylate must be present in an amount of at least 70%, with 80–99% being preferred. If more than 10% of the α-monoolefin carboxylic acid is used as ingredient (b), the intended polymerization is difficult to realize and because of the excessively high internal cohesive force, the tackiness becomes insufficient to achieve to desired adhesion to the substrate. If the amount of ingredient (b) is less than 0.1%, there is a high likelihood of particle agglomeration during the polymerization reaction. The preferred amount of ingredient (b) is in the range of 1–5%. The principal purpose of using the optional ingredient (d) is the modification of tackiness and cohesive force that is unobtainable by ingredient (a) to (c). Rosin modified resins and aromatic petroleum resins used in amounts of 1–3% enable the production of polymer microspheres having a high degree of tackiness that is hardly obtainable by the acrylic resin alone. If the amount of ingredient (d) exceeds 10%, an excessively low cohesive force results, and the desired objects of the invention are not obtained if ingredient (d) is used in an amount of less than 0.1%.

The vinyl monomers used as ingredient (B) include various methacrylates, acrylates, vinyl esters, vinyl ethers, styrenes and acrylonitriles. These monomers may be used either alone or in combination. Any vinyl monomers may be used so long as they act as binders for the sticky polymer microspheres.

Casein is used as a protective protein colloid in performing the aqueous suspension polymerization in accordance with the present invention. In addition, glue or gelatin may optionally be used. An aqueous suspension of high quality can be prepared very easily on an industrial scale by using casein as the protective colloid. The amount of the casein used varies with the required properties, but satisfactory results are obtained by using 2-8 parts of casein for 100 parts of ingredient (A). Casein is preferably used in a completely stabilized solution in ammonia or amine.

The protective colloid used in the suspension polymerization in accordance with the present invention contains casein as the principal ingredient. The preferred casein is a conjugated protein that is composed of $\alpha$-casein, $\beta$-casein and $\gamma$-casein and which has $\geq 80\%$ protein and $\leq 3\%$ ashes. The use of an acid casein is particularly preferred. Aqueous suspensions may be prepared more easily by using not only casein but also polyacryl amide or polyethylene glycol derivatives as the protective colloid. A suspension having a uniform particle size in the range of 20-50 $\mu$m is obtainable with relative ease if casein is used in combination with 30-45 wt% of a polyacrylamide or polyethylene glycol derivative. Casein has not heretofore been used in the emulsion polymerization or suspension polymerization of acrylic monomers, and has been used solely as an emulsion stabilizer for synthetic rubber and natural rubber latices. No report has been made on the use of casein as a protective colloid in the emulsion polymerization of acrylic tackifiers. The present inventors have discovered the effectiveness of using casein as an acrylic tackifier by the polymerization technique which will be illustrated in the Examples shown hereunder. When an aqueous suspension of the acrylic copolymer prepared in accordance with the present invention is applied to a substrate such as paper, the adhesive power of casein may be effectively used in enhancing the anchorage of the adhesive to the substrate. In the prior art, microspheres recovered from the suspension are stripped of water either entirely or partly, and the dried particles are dispersed in alcohols or swollen in organic solvents for preparing a coating solution. This process requires many steps and results in a high price of the final product. Such problems are absent from the present invention which uses a protective colloid containing casein as the principal ingredient. The aqueous suspension prepared by the polymerization reaction can be immediately applied to the substrate with satisfactory results. The aqueous solution containing casein does not only adhere itself to the substrate; it also enables spherical particles to be firmly adhered to the substrate. The aqueous solution may of course be dispersed in an organic solvent after reducing the water content, but this is not commercially recommendable practice since the price of the final product is thereby increased.

Anionic, nonionic or amphoteric surfactants may be used, and particularly desired characteristics are obtained by using anionic surfactants.

In the actual practice of the present invention, the intended aqueous suspension may be obtained by blending two separately prepared aqueous suspensions: (1) an aqueous suspension containing adhesive polymer microspheres made of ingredient (A) and (2) an aqueous suspension containing polymer microspheres made of ingredient (B). But in order to simplify the process and reduce the production cost, a stepwise polymerizaiton process is recommended. In the first stage of this stepwise process, ingredients (a), (b), (c) and optionally (d) are subjected to suspension polymerization in an aqueous medium in the presence of an oil-soluble initiator (e.g. benzoyl peroxide) together with the protective colloid and an optional surfactant. In this first stage, a suspension of microspheres having an average size between 10 and 100 $\mu$m is obtained. In this first stage of suspension polymerization reaction, a multi-stage process may be employed wherein the respective monomer ingredients are successively polymerized in the order that depends on their specific properties.

To the aqueous suspension prepared in the first stage, ingredient (B) is added either in the monomeric state or in the form of a pseudo-emulsion that has been prepared by vigorous agitation, and the suspension is polymerized to produce fine polymer particles having an average size of 0.1-4 $\mu$m.

The greater the size of the sticky polymer microspheres produced by the aqueous suspension polymerization in accordance with the present invention, the greater the ease with which the resulting adhesive can be removed from the adherend. But, on the other hand, the adhesive strength, anchoring quality, pot life and ease of application of the suspension are impaired. In view of these advantages and disadvantages, the size of the microspheres in the suspension preferably ranges from 10 to 100 $\mu$m. However, even an aqueous suspension containing microspheres of this size does not have a satisfactorily long pot life and the precipitation of the microspheres is unavoidable. To avoid this problem, the microspheres according to the present invention may preferably be interspersed with finer polymer particles (0.1-4 $\mu$m) that will not easily settle or float because of the Brownian movement and which have a particularly selected size that will not cause any adverse effects on the properties of the resulting adhesive. These fine polymer particles are also effective in improving the anchorage to the substrate and the adhesion to the adherend after the aqueous suspension prepared in accordance with the present invention is applied to the substrate. If use is made of microspheres of the same size that have been separated from the aqueous suspension, washed out and dried, a substrate having a uniform arrangement of the microspheres can be obtained. However, if an aqueous suspension containing microspheres of the size of 10-100 $\mu$m is directly applied to the substrate, an uneven surface resutls. Microscopically, the uneven surface contains those areas where no sticky microspheres are deposited and this will cause poor anchorage to the substrate. The ideal surface would be such that microspheres are spaced at equal intervals (5-10 $\mu$m) because the microspheres will become flat easily under pressure and they make uniform contact with the adherend so as to provide a better adhesion and, at the same time, the flattened microspheres will readily become restored to their initial round shape, thereby permitting repeated use of the adhesive product. If, on the other hand, the distance between microspheres is too great, the resilience of these microspheres works in an adverse way to reduce the area of contact with the adherend or substrate, and this causes an appreciable decrease in the anchorage to the substrate and in the sticking to the adherend. A binding layer that compensates for these losses in the anchorage and adhesiveness is preferably used and it may be provided by the fine polymer particles having an average size of 0.1-4 $\mu$m.

Not only do these particles adhere themselves to the substrate but also they serve as an agent that aids in firmly adhering the microspheres to the substrate. If the fine polymer particles are used at all, their amount is such that 20–300 parts of the monomeric ingredient (B) is used to make the fine polymer particles in terms of 100 parts of the ingredient (A) for making the sticky microspheres.

The ingredient (a), alkyl acrylate ester and/or alkyl methacrylate esters as used in the present invention may be such as butyl acrylate, 2-ethylhexyl acrylate, isooctyl acrylate, isononyl acrylate, lauryl acrylate, butyl methacrylate, lauryl methacrylate and the like.

The ingredient (b), α-monoolefin carboxylic acid may be such as acrylic acid, methacrylic acid, itaconic acid, maleic acid crotonic acid (desirable) and the like.

The ingredients (c) (vinyl monomers) as used in an amount of 0–29.9 percent by weight, desirably 0.5–10 percent by weight may be solely or in combination methyl methacrylate, methyl acrylate, ethyl acrylate, ethyl methacrylate, vinyl acetate, vinyl propionate, stylene, acrylonitrile, hydroxyethyl methacrylate, hydroxyethyl acrylate, hydroxypropyl methacrylate hydroxypropyl acrylate, N,N-dimethylaminoethyl acrylate, acrylamide, diacetone acrylamide, N-methylol acrylamide, N-methoxymethyl acrylamide, N-n-butoxymethyl acrylamide and the like. The purpose of using the ingredients (c) is to finely adjust the adhesion and cohesion.

The polymerization initiator used for the suspension polymerization may generally be oil-soluble such as benzoyl peroxide.

The adhesive composition optionally contains any water-soluble or oil-soluble anti-oxidant, ultraviolet absorber, preservative, anti-foaming agent and filler so as to improve the physical properties. To the extent that it does cause fusion bonding of the particles of the suspension to one another, any adhesive may be added to the composition so as to improve the adhesion and enhance the property of anchoring it to the base.

The water contained in the aqueous suspension of the present invention may be used in an amount of 25-70 percent by weight. the sheet used as a substrate may be paper, synthetic paper.and the like.

The adhesive composition of the present invention can be made to be an aqueous suspension containing solid ingredients in an amount above 74% such as the theoretical value, but it is most preferable, due to the stability and non-applicability of the suspension, that it is produced so as to contain about 45% of the effective ingredients. Hereinafter the present invention is illustrated by way of the following examples, wherein all parts and percentages are by weight.

EXAMPLE 1

A 1-liter 3-necked flask, fitted with a thermometer, a reflux condenser and a stirrer having a speed variator was used to carry out the stepwise polymerization of each of the components comprising (I), (II) and (III).

| | Parts | | |
|---|---|---|---|
| | (I) | (II) | (III) |
| 2-ethylhexyl acrylate | 92 | 60 | 35 |
| methylmethacrylate | | 4 | 4 |
| aliphatic hydrocarbon resin (Escolets 5300 from Esso Chemicals) | 4 | | |
| acrylic acid | 2 | | 0.5 |

-continued

| | Parts | | |
|---|---|---|---|
| | (I) | (II) | (III) |
| benzoyl peroxide | 1 | 0.5 | 0.5 |
| anionic surfactant (New call 210 from Nihon-Nyukazai) | 1 | 1 | |
| nonionic surfactant (HLB = 15) (New call 568 from Nihon-Nyukazai) | 0.5 | 0.5 | |
| aqueous casein solution having a concentration of 15% | 40 | | |
| polyethyleneoxide having a molecular weight of 100,000-150,000 (PEO-1 from Seitetsu-Kagaku-Kogyo) | 2 | | |
| Water | 212 | 70 | |

Component (I) was charged at one time into 3-necked flask. After the contents were dissolved or mixed at a rate of stirring of about 300 rpm, it was purged with $N_2$ gas. Thereafter, as the temperature of the contents was gradually raised, the polymerization reaction started at a temperature of 70°14 75° C. and became rapidly active from 80°–82° C. before subsequent exothermic reaction at 85°–88° C. It was then cooled and polymerized for 2 hours while maintaining the temperature at 81°–82° C. An aqueous suspension containing polymeric microspheres having particle sizes on the order of 10–80 was formed in the flask. This was subsequently brought to the next stage of polymerization. Component (II) which was dissolved or mixed in a separate vessel was formed into a pseudo-emulsion, using high speed stirring. The component (II) thus obtained was added dropwise into the previously formed aqueous suspension over a period of 60 minutes, followed by reaction for 1 hour at 81°–82° C. Stepwide polymerization reaction then proceeded in a similar manner for 3 hours, the component (III) being added dropwise over a period of 30 minutes. Thereafter, the aqueous suspension which formed was cooled until 30° C., and the evaporation residue, viscosity and particle size there of were confirmed. The evaporation residue was 39.8%, the viscosity 12,000 cp, and the particle size 0.1–3$\mu$ for smaller particles and 10–80$\mu$ for larger particles.

EXAMPLE 2

Using the apparatus and procedure described in Example 1, components (IV), (V) and (VI) were stepwisely polymerized in the same manner as in Example 1.

The aqueous suspension obtained was one which had an evaporation residue of 40.0%, viscosity of 1400 cp/20° C. and particle size distribution in which smaller particle size ranged from 0.5–2$\mu$ and larger particel size ranged from 20–60$\mu$.

EXAMPLE 3

Using the apparatus and procedure described in Example 1, 20 parts of an aqueous casein solution having a concentration of 15% which had previously dissolved, 2 parts of polyethyleneoxide with a molecular weight in the range of 100,000–150,000 (PEO-1 from Seitetsu Kagaku Kogyo), 0.5 parts of anionic surfactant, and 250 parts of $H_2O$ were charged into the apparatus and throughly agitated to form an aqueous solution.

Then, in a separate vessel, 100 parts of 2-ethylhexylacrylate, 90 parts of butylacrylate, 10 parts of ethylacrylate, 1.5 parts of crotonic acid, and 0.5 parts of benzoyl peroxide were dissolved with stirring.

This monomer mixture solution was then added with stirring to the previously prepared aqueous solution. The aqueous suspension polymerization was effected for 2 hours at a rate of stirring of about 200 r.p.m. and a reaction temperature of 80°–82° C. An aqueous suspension containing microspheres having a particle size in the range of 25–70μ was formed in the flask. The evaporation residue of the suspension was 43.0% and the viscosity 1,800 cp/20° C. Next, in a separate vessel, 1 part of anionic surfactant, 4 parts of monionic surfactant, 300 parts of $H_2O$, 1 part of potassium persulfate, 2 parts of secondary sodium phosphate, 0.5 parts of hydrogen sodium sulfite, 5 parts of acrylic acid, 100 parts of butylacrylate, and 100 parts of ethylacrylate were emulsion-polymerized in the normal way to form an emulsion which had an evaporation residue of 41.0%, viscosity of 1000 cp/20° C. and particle size ranging from 0.1 to 0.5μ.

This emulsion liquid (20 parts) was added to the aqueous suspension liquid (100 parts) prepared beforehand to form a mixture. This mixture had 43.0% of evaporation residues with a viscosity of 1650 cp/20° C. The repeatedly usable and releasable adhesive was coated on wood free paper (55K) with a desk coater and dried directly so as to result in an amount of 10–15 g/m² of the adhesive. The adhesive sheet thus prepared was stuck on a stainless steel board and its adhesive force, retention and tack number were determined in accordance with JIS Z 0237-1980 as follows.

| | Sample | | | |
|---|---|---|---|---|
| | Example 1 | Example 2 | Example 3 | Repeatedly usable and releasable adhesive (solvent form product on the market) |
| Number of times (repeatedly sticking on plastic board and releasing therefrom | More than 100 | More than 100 | More than 100 | Three |
| Adhesion force (width: 25 mm) | 300 g | 130 g | 70 g | 200 g |
| Retention (distance or time of slip) | No slip | No slip | No slip | No slip |
| Tack (No.) | 6 | 6 | 5 | 7 |
| Stability (when left to stand at room temperature) | Good (more than two months) | Good (more than two months) | Good (more than one month) | — |

EXAMPLE 4

A 1-liter indented 3-neck flask fitted with a stirrer was charged with 100 parts of water, 30 parts of a casein ammonia aqueous solution (Consentration: 15%) dissolved beforehand and 1 part of an anionic surface active agent with stirring. Another vessel was charged with 25 parts of 2-ethylhexyl acrylate, 25 parts of butyl acrylate, 1.5 parts of crotonic acid and 0.5 parts of benzoyl peroxide. The mixture in the vessel was dissolved with stirring. The monomer mixture was added to the aqueous solution prepared by the above procedure with stirring. The polymerization reation started with stirring (about 200 r.p.m.) at a temperature of 70°–75° C., became vigorous at 80°–82° C. and the solution was heated at 85°–88° C. The solution was cooled to 81°–82° C. and maintained for two hours. An aqueous suspension having uniform particle diameter was formed in the flask. Then, the following polymerization steps was conducted. 2-Ethylhexyl acrylate (25parts), butyl acrylate (25 parts), an anionic surface active agent (0.5 parts), crotonic acid (1.5 parts), benzoyl peroxide (0.5 parts) and water (50 parts) were mixed in another vessel. Thereafter, one half of the mixture of these ingredients was dropped into the flask for thirty minutes, and the aqueous suspension was maintained for an hour at 81°–82° C. The remaining half of the above mixture was then dropped into the flask and the reaction continued for three hours. After cooling and taking out the aqueous suspension from the flask, its evaporation residues and viscosity were determined. The former was 37% and the latter was 250 cp/30° C.

EXAMPLE 5

The same equipment and procedure outlined in Example 4 were used except that butyl acrylate (2.5 parts) taken out from the total 50 parts thereof was initially charged into a 3-neck flask, acrylonitrile was used as an ingredient of dropper and 2 parts of polyethylene oxides (PEO-1, product of Seitetsu Kagaku Kogyo) having molecular weight of 100,000–150,000 was added to the casein ammonia aqueous solution (20 parts, Concentration 15%). The aqueous suspension thus prepared had evaporation residues of 36.5% and a viscosity of 500 cp/30° C.

The repeatedly usable and releasable adhesive prepared by the procedure outlined in Examples 4 and 5 was coated on wood free paper (55K) with a desk coater and dried directly so as to result in an amount of 20–25 g/m² of the adhesive.

The result of the same experiment as was conducted in Examples 1 through 3 was as follows.

| | Sample | |
|---|---|---|
| | Example 4 | Example 5 |
| Average particle diameter | 20–50μ | 10–30μ |
| Number of times (repeatedly sticking on wood free paper and releasing therefrom) | More than 100 times | More than 100 times |
| Adhesion force (width: 25 mm) | 120 g | 80 g |
| Retention (distance of slip) | No slip | No slip |
| Tack (No.) | 6 | 3 |

What is claimed is:
1. An aqueous suspension composition comprising:
   (A) adhesive copolymer microspheres having an average particle diameter of 10–100μ prepared by aqueous suspension polymerization of 100 parts by weight comprising the following monomers (a), (b) and (c) in the presence of a protective colloid comprising casein as a main ingredient:
   (a) from 70 to 99.9 percent by weight of at least one monomer selected from the group consisting of alkyl acrylate esters and alkyl methacrylate esters, in which said alkyl moiety has 4–12 carbon atoms,
   (b) from 0.1 to 10 percent by weight of at least one α-monoolefin carboxylic acids, and
   (c) from 0 to 29.9 percent by weight of at least one monomer other than the foregoing (a) and (b), selected from the group consisting of acrylates and methacrylates and (B) homopolymer or copolymer microparticles having an average particle diameter of 0.1–4μ prepared by polymerization of 20–300 parts by weight of at least one monomer selected from the group consisting of acrylates and methacrylates in an aqueous medium.

2. The composition according to claim 1, wherein said α-monoolefin carboxylic acid is crotonic acid.

3. The composition according to claim 1, wherein the amount of ingredient (c) contained is from 0.5 to 10 percent by weight.

* * * * *